March 12, 1935.   M. THOMAS   1,994,411
AUTOMATIC PIN RESETTING MECHANISM FOR BOWLING ALLEYS
Filed Aug. 14, 1934   7 Sheets-Sheet 4
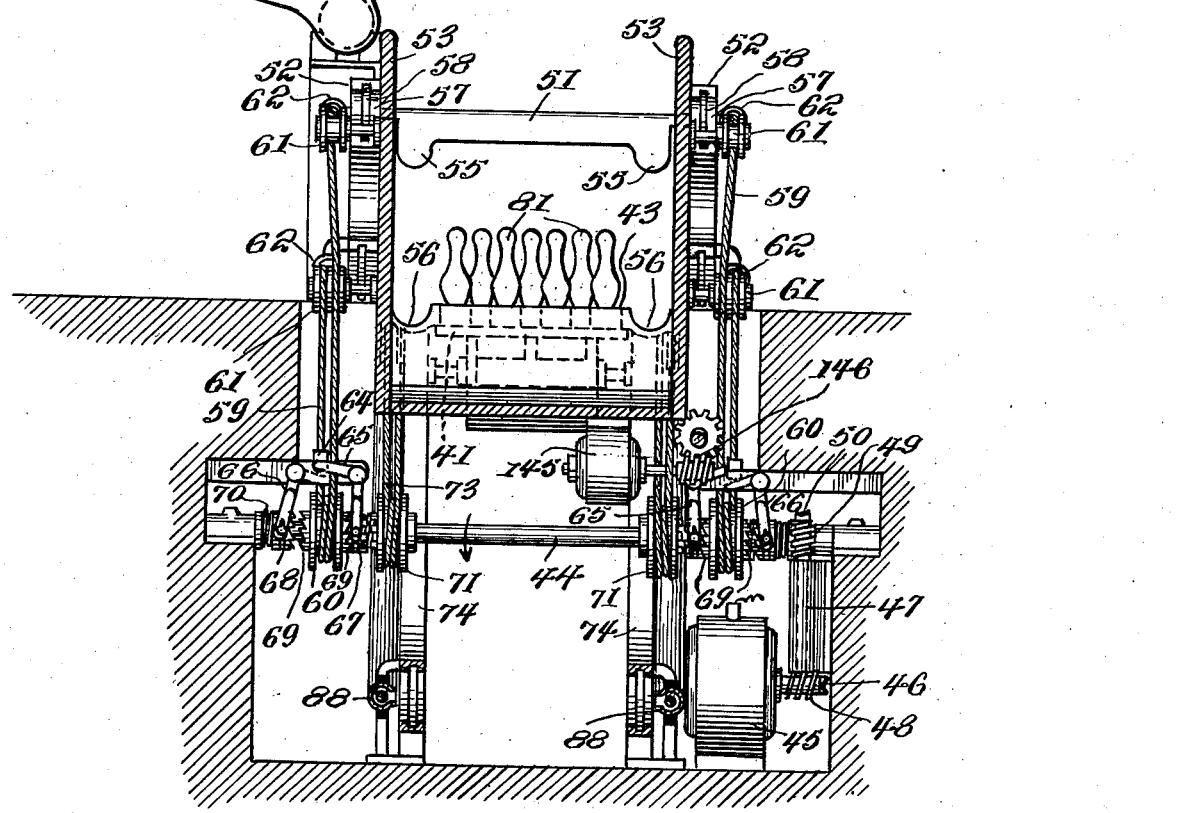
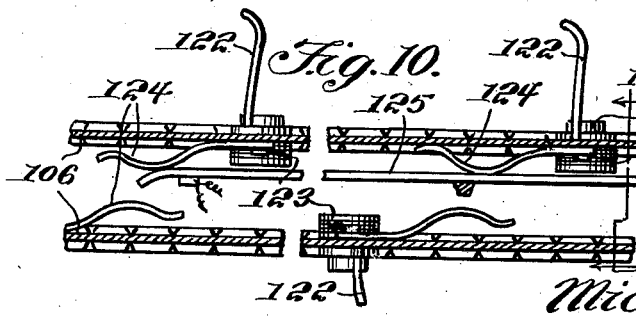
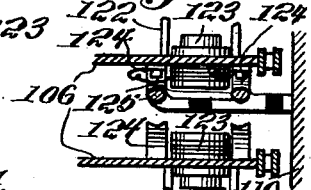
Michael Thomas
INVENTOR
BY Victor J. Evans & Co.
ATTORNEY
WITNESS: J. T. L. Wright

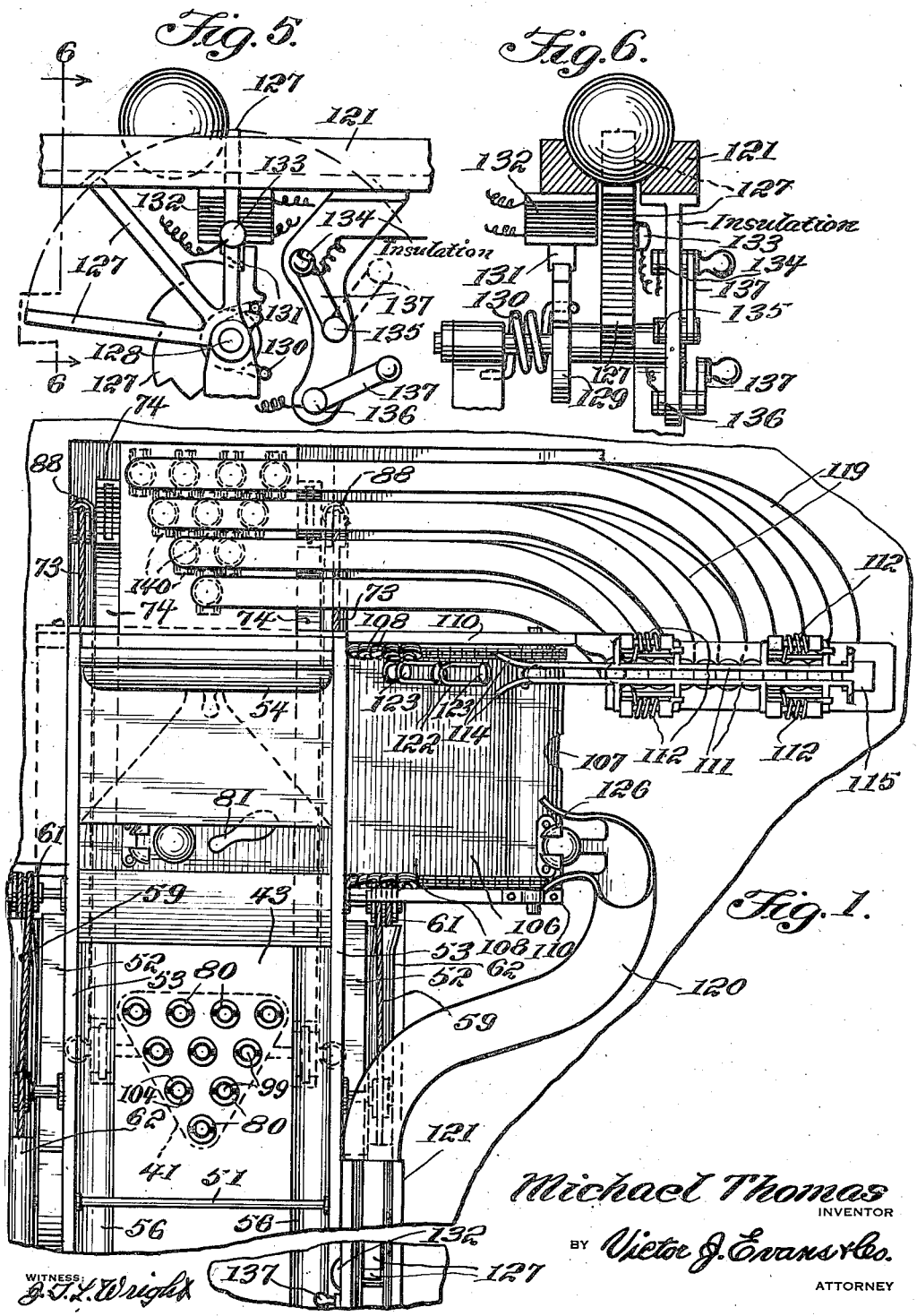

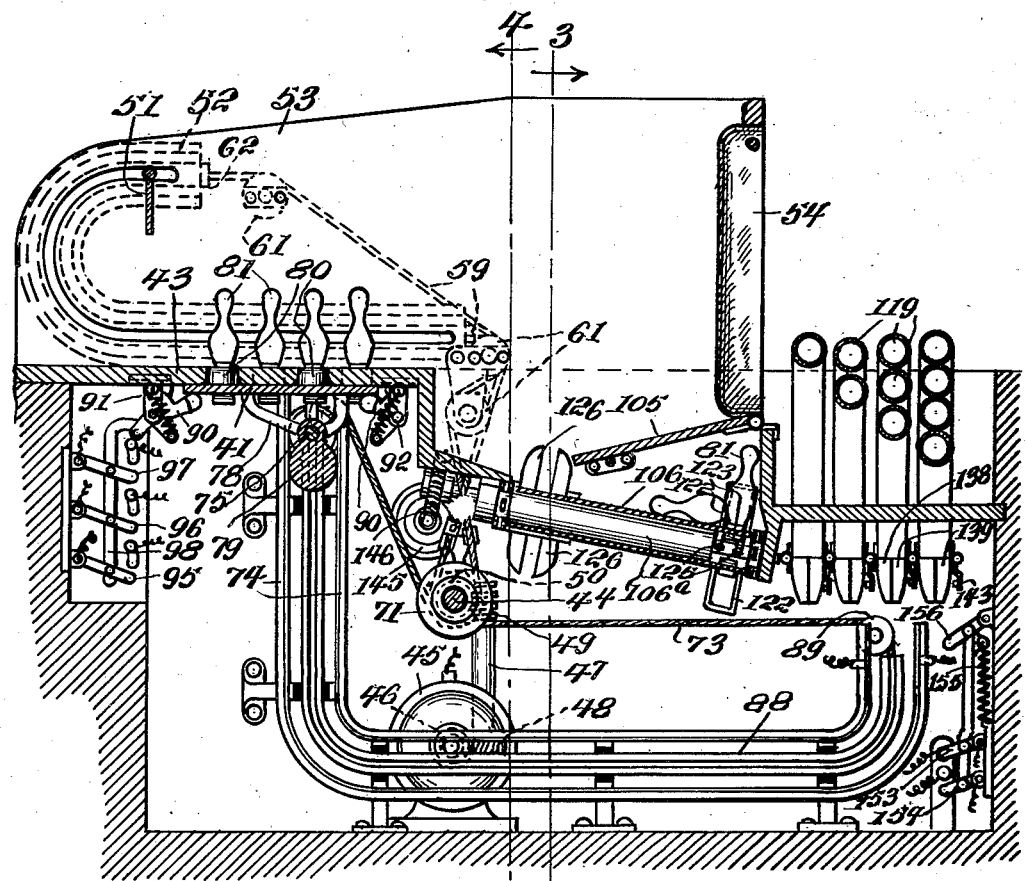

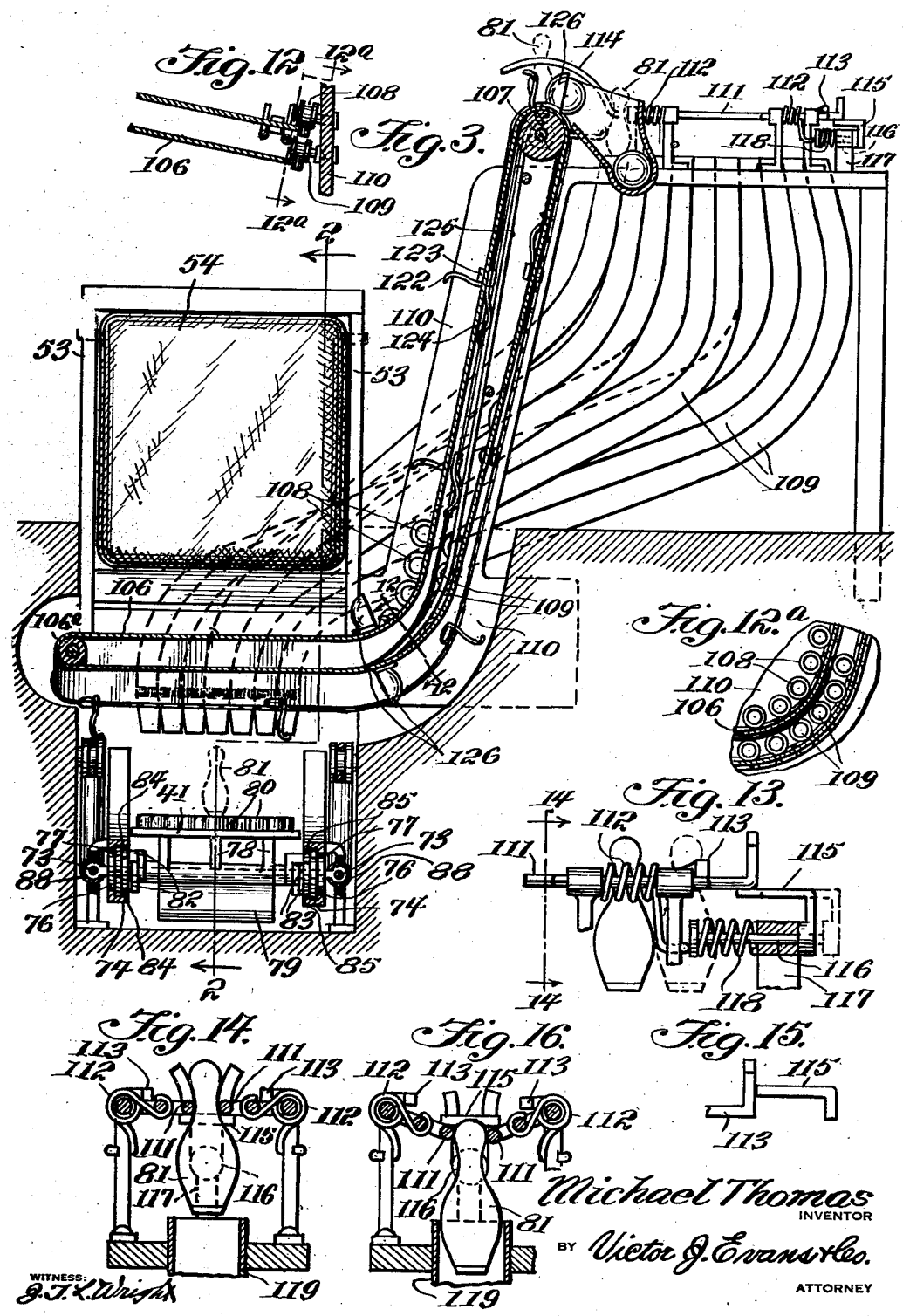

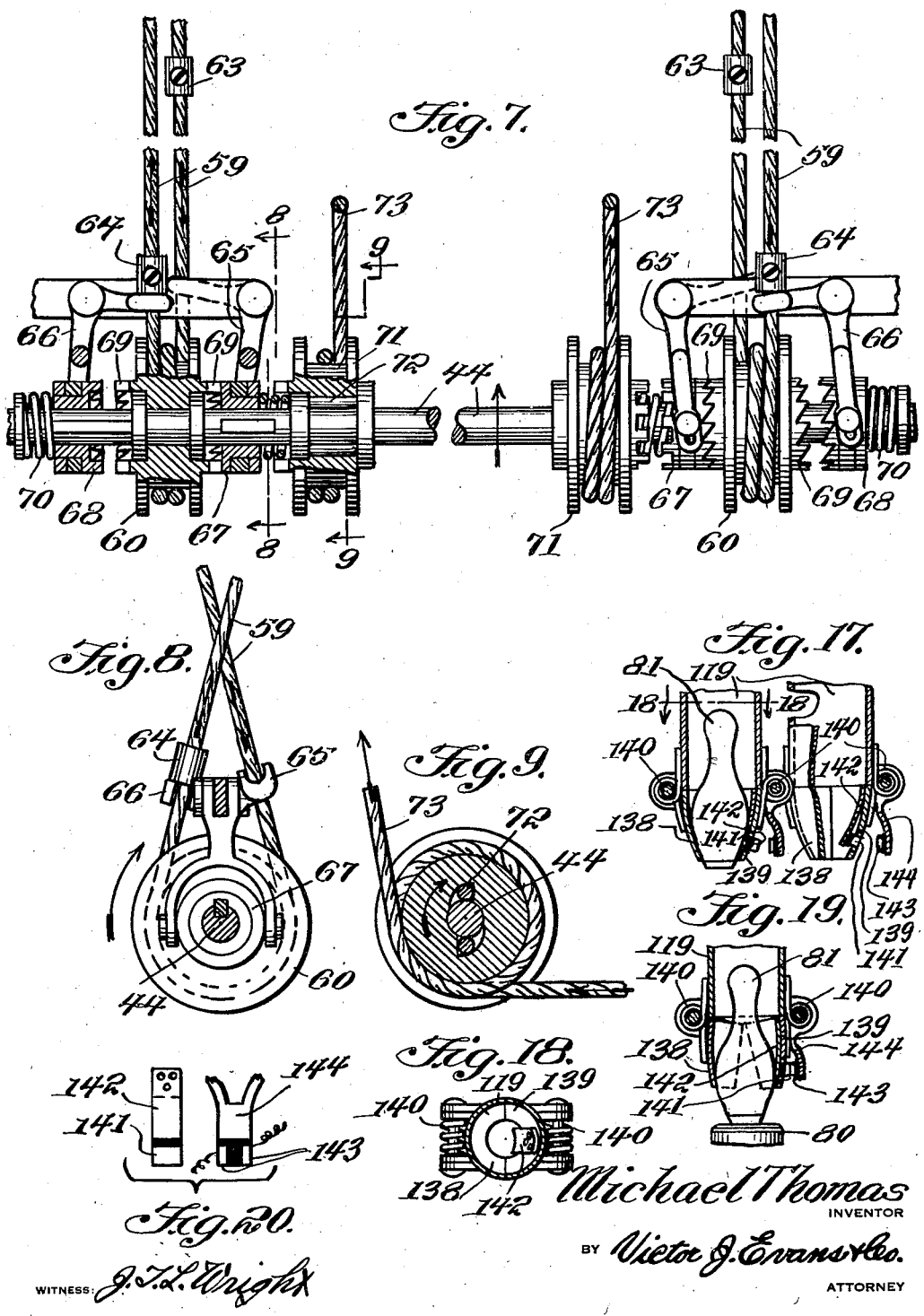

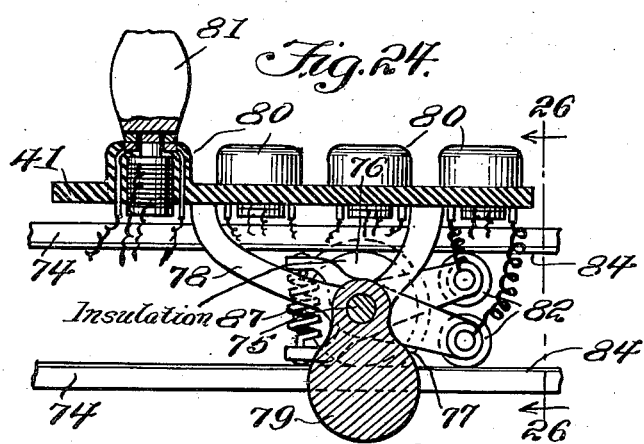
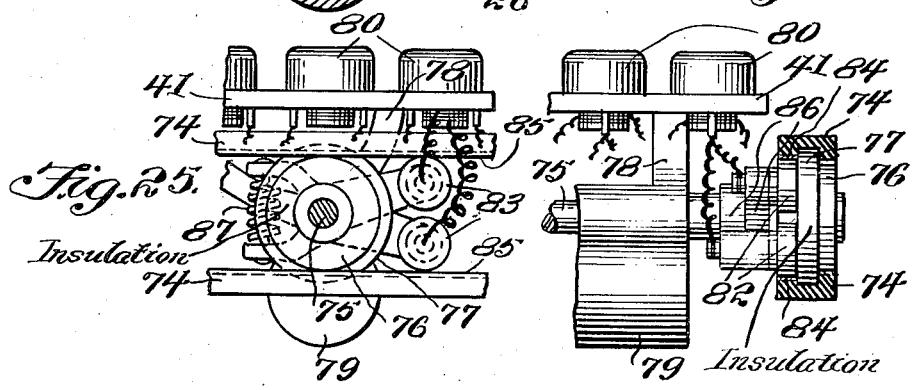
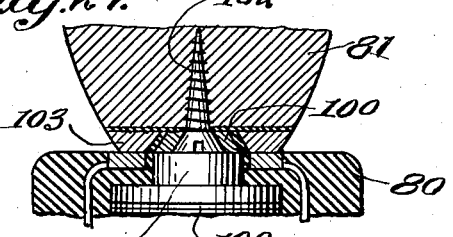
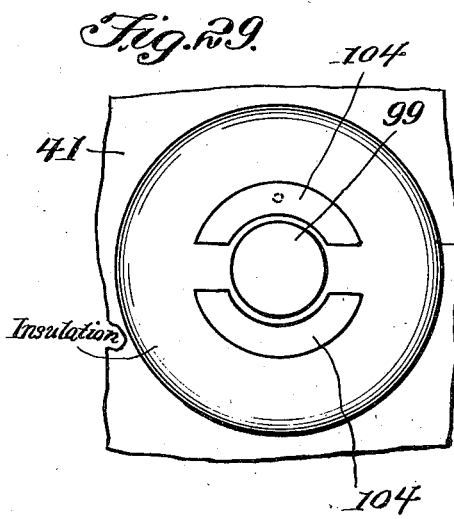

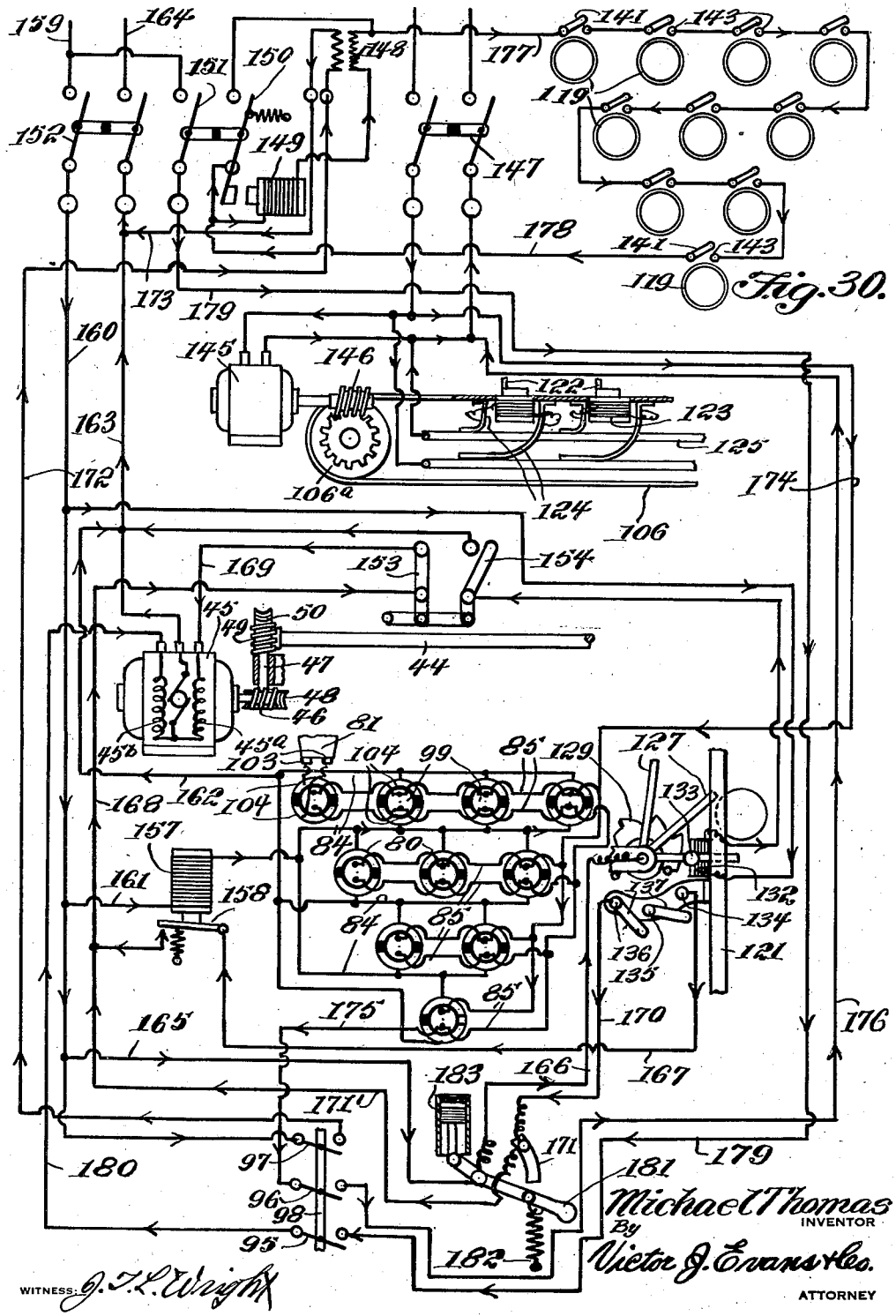

Patented Mar. 12, 1935

1,994,411

UNITED STATES PATENT OFFICE 1,994,411

AUTOMATIC PIN RESETTING MECHANISM FOR BOWLING ALLEYS

Michael Thomas, Los Angeles, Calif.

Application August 14, 1934, Serial No. 739,771

20 Claims. (Cl. 273—43)

The object of the invention is to provide a pin resetting mechanism for bowling alleys whereby, when all the pins have been knocked down, they will be automatically returned to their respective pin spots in the alley; to provide a mechanism of this character in which the automatic function is accomplished by mechanism actuated by the balls as they are returned to the runway end of the alley; to provide a construction for selectively determining which ball, in being returned, shall set the mechanism in operation; to provide a pit in which the pins are received and from which they are automatically picked up and assembled to be repositioned in the alley; to provide means that will prevent the resetting operation being carried out with any less than the full complement of pins; to provide a construction that will carry out its automatic function even though some of the pins may be left in the alley after being knocked down; to provide a mechanism of the kind indicated in which the resetting operation may be started manually, as where a pin or two or more may be knocked down by a stray ball from an adjacent alley; and generally to provide an automatic pin resetting mechanism which is not susceptible of disarrangement of its parts and which can be relied upon to function consistently under all conditions of use.

With this object in view, the invention consists in a construction and combination of parts of which a preferred embodiment is illustrated in the accompanying drawings, wherein:

Figure 1 is a plan view of the pit end of a bowling alley showing the invention applied in operative position.

Figure 2 is a sectional view on the plane indicated by the line 2—2 of Figure 3.

Figures 3 and 4 are sectional views on the planes indicated by the lines 3—3 and 4—4 respectively of Figure 2.

Figure 5 is a side elevational view of a ball-actuated step-by-step circuit closer.

Figure 6 is a sectional view on the plane indicated by the line 6—6 of Figure 5.

Figure 7 is an enlarged detail view partly in section and partly in elevation of the main drive shaft for the transfer table and sweep.

Figures 8 and 9 are sectional views on the plane indicated by the lines 8—8 and 9—9 respectively of Figure 7.

Figure 10 is an enlarged detail sectional view of the conveyor belt.

Figure 11 is a sectional view on the plane indicated by the line 11—11 of Figure 10.

Figure 12 is a sectional view on the plane indicated by the line 12—12 of Figure 3.

Figure 12a is a sectional view on the plane indicated by the line 12a—12a of Figure 12.

Figure 13 is an enlarged detail elevational view, partly in section, of the pin latch at the rack end of the frames thereof.

Figure 14 is a sectional view on the plane indicated by the line 14—14 of Figure 13.

Figure 15 is a detail elevational view of the pin rack frames at the trip end, showing the trip in release position.

Figure 16 is a sectional view similar to Figure 14 but showing the rack frames in pin discharge position.

Figure 17 is a detail sectional view of a part of the complement of pin chutes, at the discharge ends of the latter.

Figure 18 is a sectional view on the plane indicated by the line 18—18 of Figure 17.

Figure 19 is a sectional view similar to Figure 17 but showing the pin chute discharging the pin.

Figure 20 is a collective elevational view of the complemental circuit closers mounted on the pin chutes at the discharge ends.

Figure 21 is a detail sectional view showing the pin table and the associated releasable latch member maintaining the latter in rigid position in the floor of the alley.

Figure 22 is a view similar to Figure 21 but showing the relative positions of the latch and pin table when the latter is moving toward or away from the floor of the alley.

Figure 23 is a sectional view on the plane indicated by the line 23—23 of Figure 2.

Figure 24 is a vertical sectional view of the pin table.

Figure 25 is a detail elevational view of a section of the pin table.

Figure 26 is a sectional view on the plane indicated by the line 26—26 of Figure 24.

Figure 27 is a detail sectional view of one of the pin spots with which the table is provided, the bottom or spot engaging end of the pin being also shown in section.

Figure 28 is a bottom plan view of one of the pins, illustrating the spot engaging seat of the same.

Figure 29 is a top plan view of one of the pin spots.

Figure 30 is a diagrammatic view illustrating the various apparatus comprised in the invention and the various circuits by means of which they are operatively connected.

The pins 81 when set in their usual positions adjacent the pin end of the alley are carried on a pin table 41 which is provided with the pin spots 80 passing through appropriate openings in the floor 43 of the alley when the table is in position. After the pins shall have been knocked down, the pin table moves from its position in the floor of the alley to a remote position therefrom to receive the pins after they have been gathered up and arranged in proper position to be returned to the table. The movement of the table from its position in the alley to its pin receiving position is accomplished by means of the transfer mechanism comprising a main drive shaft 44 arranged transversely of the alley but below the floor thereof and in constant motion when the apparatus is in operation by reason of the driving connection which it has with the motor 45. Since the angular speed of the shaft 44 must be materially below that of the driving motor, the operative connection between the two consists of a worm 46 on the latter driving a connected shaft 47 by reason of meshing with a worm wheel 48 on the extremity of said shaft. The shaft 47 is in turn provided with a worm 49 in mesh with a worm wheel 50 on the shaft 44. While the shaft 44 is in constant rotation when the motor 45 is in operation, it only moves the table after it shall have moved the sweep 51, the latter being mounted in the tracks 52 disposed on the outer faces of the two side guards 53 of the alley. The side guards extend from a point in advance of the pin table back to the bumper or buffer 54 and the tracks are of J-shaped form with the axis of the J disposed in a horizontal plane, the longer legs lying adjacent the floor of the alley, so that the shorter legs lie vertically spaced therefrom. The curved portions of the tracks are at the forward ends of the guards. The sweep on the lower edge and at opposite ends is formed with pendent ears 55 having the conformation of the cross-sectional contour of the gutters 56, so that these ears enter the gutters when the sweep is adjacent the floor as it will be when traversing the longer legs of the tracks. The sweep is terminally provided with rollers 57 which support it in the track and in order that there may be no movement of the sweep in the direction of its length, or transversely of the alley, the rollers are formed with central flanges 58 which are disposed in grooves in the track. In operation, the sweep moves from its normal position in the shorter legs of the J around the curved portion of the track and then along the longer leg portions, when it will sweep any pins remaining on the alley into the pit, whether or not these pins be on the alley floor or in the gutters 56. Movement is imparted to the sweep from the shaft 44 by reason of cables 59 which are coiled several times around the drums 60 mounted on the shaft 44 and are trained over direction pulleys 61 from which they pass through the guide tubes 62, the latter being mounted laterally on the tracks 52 conterminous with the latter, being provided with lateral slots opening towards the tracks 52, so that terminal fingers with which the sweep is provided on the outer faces of the rollers 57 may enter the tubes to engage the cables. It is obvious, from this arrangement, that when the drums are rotated, the sweep is caused to execute a movement such as will lower it into a position adjacent the floor of the alley and then move it longitudinally across the pin spot area thereof to sweep any pins on the alley floor or in the gutters thereof into the pit.

The drums 60 which effect movement of the sweep are clutched with and declutched from the shaft 44 and this clutching and declutching operation is effected automatically, the cables 59 being provided with adjustable collars 63 and 64 arranged to alternately actuate the pivotally mounted clutch shifters 65 and 66, the former actuating clutch members 67 and the latter clutch members 68, all of which are keyed to the shaft so that they may move axially thereof but be precluded from angular or turning movement on the shaft. The drums 60 are formed with clutch teeth on opposite sides, as indicated at 69, to constitute companion clutch elements for the clutch members 68 and 67 and these latter are normally spring impelled, as indicated at 70, into clutching position with the drums. But the clutch elements 67 are also formed with clutch teeth on the opposite face from that which engages the clutch teeth 69, so that the clutch elements 67 may be clutched with the drums 71 which are also mounted on the shaft 48 but are precluded from axial movement thereon, although they are mounted to positively engage the shaft 44 in one direction of movement of the latter but to permit relative angular or turning movement relative to the shaft in the reverse rotation of the latter. This because of the conventional overrunning ball clutches 72 with which the drums 71 are provided.

The drums 71 constitute the means by which movement is communicated to the pin table and they therefore drive the cables 73, of which several convolutions are wound around the drums, the cables being anchored to the pin table 41. The pin table is mounted in and traverses the track 74, being supported on its base frame 78 which is in turn carried by the shaft 75 terminally equipped with the rollers 76 engaging the track rails and provided with central circumferential flanges 77 disposed in the grooves of the rails. The track 74 has a section disposed vertically below the floor of the alley, this section connecting with a horizontal section which in turn terminates with a short vertical section. Thus, the table in traversing the track drops from its position in the floor of the alley until it reaches the horizontal portion, when it moves laterally and finally ascends the short vertical section to receive the pins which at this time have been transferred to a point to be delivered to the table. But the table is always retained in the horizontal position and the base frame 78, therefore, has a pivotal mounting on the shaft 75 so that the weight 79 which is formed as a part of the base frame may dispose the center of gravity of the whole table structure below the center of the shaft 75. The pin spots 80 arranged in the conventional triangular form on the top of the table are energized to maintain the pins 81 in upright position and in order that this energization may be accomplished electrically, the pin spots are fed from collector rollers 82 and 83 arranged in pairs to engage collector strips 84 and 85, also arranged in pairs on the two opposite track rails. The mounting of the collector rollers 82 is identical with the mounting of the collector rollers 83 but the two sets of collector rollers are necessary for the pin spots, as they embody independent circuits. The rollers are carried on pivotally mounted arms 86 having tail extensions between which compression springs 87 are disposed. The arms have a common pivotal mounting and the one spring for each pair thus serves to hold the attendant rollers in engagement with their respective conductor strips.

Cables 73 follow a path corresponding to the outline of the track 74 by reason of the guide tubes 88 disposed laterally of the track on the outside and provided with longitudinal slots opening toward the track, so that the shaft of the table may enter the guide tubes where it engages the cables. From the drums 71, the cables are directed over guide rollers 89 at the extremities of the track.

When the table is in position in the floor of the alley and the pins on the spots thereof, the shaft 44 and motor 45 are at rest. The construction calls for the motor being set in operation by the balls as they are returned to the runway end of the alley, a predetermined ball functioning to set the motor in operation by means hereinafter fully described. When the shaft 44 begins to rotate, the first operation is to lower the sweep. At this time, the clutch elements 67 will be engaged with their companion elements on the drums 60 and therefore the cables 59 will be caused to move, thus moving the collars 64 away from their clutch shifters 66 and permitting the clutch elements 68 to also engage the drums. But since both sets of clutch elements 67 and 68 are keyed to the shaft 44, the simultaneous engagement of them with the drums will not result in any contrary operation of the several parts. As the cables 59 continue to move in this direction, the sweep will be lowered and finally all pins that may be on the alley will be swept into the pit. But the drums 71 will not be operated during this interval because the shaft 44 may move relative to them by reason of it rotating in the declutching direction with respect to the overrunning clutches 72. The movement of the drums 60 in the above-indicated direction will continue until the collars 63 have advanced to the point where they engage the clutch shifters 65, thus declutching them from the drums 60 but clutching them with the drums 71. Thereupon shaft movement will be communicated to the drums 71, so that the pin table will be withdrawn from its position in the floor of the alley and transferred to the remote end of its track 74. But the clutch elements 68, while engaged with the drum 60, during this interval, will not impart any turning movement to the latter, for whatever twisting or turning force is imparted is through the clutch elements 68 and by reason of the ratchet teeth with which they are provided and the corresponding teeth on the drums 60, the teeth on the clutch elements and drums will merely slide or ratchet over each other. When the shaft 44 is rotating in this direction, the clutches 72 are inactive by reason of the direction of rotation being such as to effect declutching action of these clutches and therefore no motion is communicated to the drum 71 through them but only through the clutch elements 67.

After the table receives the pins when it is positioned at the remote end of the track 74, it is returned to its normal position in the alley but this follows after the interval of the pin receiving operation, when the motor is again set in motion, after having been stopped by the table reaching the remote end of the track. But in the return movement, the direction of rotation of the motor is reversed, so that the shaft 44 then rotates in the opposite direction than formerly, when the clutches 72 become operative to clutch the drums 71 to the shaft. With the reverse rotation of the drums, reverse movement is imparted to the cables 73 and the pin table is returned. At the same time, the teeth on the clutch elements 68, no longer ratchet over the teeth on the drums 60 but provide driving connection between these clutch elements and the drums, so that reverse rotation from formerly is imparted to them with the result that the cables 59 are moved in the opposite direction, thus returning the sweep to its inactive position. As soon as the collars 63 leave the clutch shifters 65, the clutch elements 67 are disengaged from the drums 71 and reengaged with the drums 60 but can impart no driving motion to the drums by reason of their teeth ratcheting over the drum teeth in the same manner as the teeth of the clutch elements 68 ratcheted over the drum teeth in the previous rotation of the shaft. When the clutch elements 68 have rotated the drums 60 a sufficient time, the collars 64 will be engaged with the clutch shifters 66 and disengage the clutch elements 60 from the drums, so that the sweep will then stand at rest in its elevated or inoperative position. When the pin table returns to its position in the floor of the alley, the motor 45 is automatically brought to rest as fully explained hereinafter.

The table when in its position in the floor of the alley is retained against vibration by the rocker pressure feet 90 pivotally mounted in brackets 91, the brackets being disposed on the under face of the alley floor and on opposite sides of the table. The pressure feet are susceptible of two positions in either of which they are yieldingly held by reason of the tension springs 92. The springs are tensioned between projecting arms of the feet and points on the brackets 91 which are eccentric to the pivotal mounting of the feet in the brackets. Thus the feet may swing to either of two positions, in doing which the springs pass the pivots of the feet and contract on either side of the pivot. The feet are formed with toes 93 which bear against the under face of the table when the table is in position in the floor of the alley. When it is lowered from such position, the pressure applied to the feet rocks them so that the toes are disposed out of obstructing relation to the table when it may then be transferred to the remote end of its track. In returning to position, the feet are rocked back to their normal position by the engagement of the upper face of the table with the lugs 94 of the feet. One of the pressure feet is designed to operate a series of control switches, these switches being indicated at 95, 96 and 97. The switches are single-pole but are connected for synchronous movement by means of an actuating bar 98 which is coupled to the pressure foot by which the switches are to be actuated. These switches control in part the operation of the mechanism as hereinafter described. The pin spots 80 with which the table is provided are in the form of cylinders of insulating material and their top faces are flush with the top face of the floor of the alley when the table is in position, since the top face of the table abuts the under face of the alley floor and the cylinders seat in openings formed in the floor. The pin spot cylinders are closed on the upper ends but there is exposed at the center of the top face the cores 99 of electromagnets 100 which are housed in the cylinders and which are energized from current conducted to them through the collector rollers 83. These electromagnets constitute pin retaining means to hold the pins 81 in position, after they are received on the table and are being transferred to their places in the alley. To provide for the magnets effecting an attractive force on the pins, each is provided with a center disk 101 secured on the bottom, as by means of a wood screw 102, the disk 100 being of magnetic material. But the pins, aside from being provided with means to make possible their retention on the table by magnetic attraction, also function as circuit closers and to this end each is provided with a metallic ring 103 of non-magnetic material, this ring being disposed in surrounding relation to the disk 100 and retained in position by the latter by reason of the disk which is peripherally beveled, seating in the countersunk eye of the ring. When the pin is in position on the spot, the ring bridges the segments 104 which are set in the top face of the spot cylinders 80, flush with the top face thereof. One of the segments 104 is electrically connected with one of the collector rolls 82 and the other segment with the other roll 82. Those conductors which the rolls 82 traverse are electrically bridged by any one of the pins when on its spot. The purpose of this arrangement appears hereinafter.

The alley is formed with the usual pit at the far end which is provided with a forwardly-directed downwardly-inclined floor 105 below which is disposed the conveyor belt 106, this conveyor belt being disposed in a rearwardly-inclined plane, or the opposite direction than the plane of inclination of the floor 105. At one side of the alley, the belt is carried by a roller 106a and at the other side of the alley is upwardly inclined and traverses a roller 107. The bend in the belt to give the upward inclination traverses a series of rollers 108 and 109, these rollers contacting with the upper and lower runs of the belt and the two sets being disposed one set on each of the walls 110, which constitute the side walls for the ascending portion of the belt. The rollers 108 and 109 are disposed in concentric series, so that the change in direction of the belt is effected with a gradual or easy curve. The conveyor belt elevates both the pins and the balls and discharges the former onto a pin rack composed of oppositely-disposed pivotally-mounted frames 111 yieldingly retained in horizontal position by means of torsion springs 112 with which they are provided, the frames abutting stops 113 in their horizontal positions. The extremities of the frames are formed with horn members 114 which jointly act as guide fingers for directing pins onto the rack between the frame members. When the pins drop onto the rack between the frame members, they are held between the latter by their necks and the frame members are latched in their horizontal positions by a shiftable abutment bracket 115 of angular form and carried on a stem 116 which is slidably mounted in a support 117. A compression spring 118 surrounds the stem and is compressed between the head of the latter and the support 117. But the head of the stem serves as an abutment to be engaged with the bellied or bulged portion of the first pin dropped into the rack and when the full complement have been received, the rack is of such a length, that the stem 116 will be moved axially against the pressure of the spring 118, until the bracket 115 is moved from obstructing position to the rack frames 111. Then the weight of the pins is sufficient to swing the frames 111 downwardly, as clearly shown in Figure 16, so that the pins are released from the rack, when they drop one each into chutes 119, the chutes being in the form of tubes with their intake ends arranged in a row directly beneath the pin receiving rack and their discharge ends arranged in the form of a triangle directly above the pin spots of the pin table in the remote position of the latter on its track 74.

The conveyor belt not only transfers the pins to the pin receiving rack but also functions to transfer the balls to the ball chute 120 from which they are transferred to the ball return rack 121. The floor 105 and that portion of the conveyor belt running laterally of the alley are arranged in converging planes and are so positioned that the forward edge of the floor is spaced above the belt enough to permit the passage of the pins but to preclude the passage of the balls. Thus the balls are retained at one side of the belt whereas the pins may roll to the opposite side, so as to be taken up on the pin seats which are in the form of racks 122 secured to the belt at spaced points along one edge, each rack having associated therewith an electromagnet 123 with which the base of the pin may be engaged, the neck of the pin falling in the loop of the rack, since the latter is made from a single strand bent into U-shaped form with the return bend deflected from the plane of the legs of the U. The electromagnets of the pin racks are energized during the interval when that pin rack is moving on the top run of the belt and to accomplish this energization, the belt on the under side is provided with spring collector brushes 124 electrically connected with the windings of the magnets and bearing on the spaced conductor bars 125. Since the pins, in entering the pit, will roll forward to the forward edge of the floor and thence drop on the belt to roll to the far end of the pit, they will be in positions to be picked up by the passing racks 122 because as they fall into position on the latter, they will be retained in position by the action of the magnets 123, until they are discharged onto the pin receiving rack between the horns 114 of such rack.

The balls are carried to the intake end of the ball chute 120 by ball racks 126 with which the conveyor belt is provided and which are spaced uniformly along the conveyor belt but at the opposite edge from the pin racks. The ball being moved by the upper run of the belt, will be discharged from the rack by which it is carried as the belt turns the roller 107 and thence will drop into the chute 120 from which it is transferred to the return rack 121.

But the ball, in moving down the return rack to the runway end of the alley will actuate a circuit closer which is in the form of a plurality of divergent arms 127, uniformly spaced angularly, so that one or the other invades the return rack 121 to be encountered by the ball. These arms are carried on a shaft 128 suitably mounted for rocking movement below the return rack 121. The shaft 128 also carries a ratchet wheel 129 and is provided with a torsion spring 130, tending to rotate the shaft in one direction, or in the opposite direction in which the shaft is normally rotated by the passing balls. The angularly spaced arms 127 provide for a step-by-step movement of the circuit closer and retrograde movement is precluded by means of a pawl 131 normally engaged with the teeth of the ratchet wheel but retracted from its obstructing position with reference to the latter through the instrumentality of an electromagnet 132.

The leading arm 127 is provided with a contact 133 to contact with the angularly spaced stationary contacts 134, 135 and 136, mounted on a suitable insulating plate. The contacts 134, 135 and 136 are normally insulated from each other but may be electrically connected by means of pivotal bridge arms 137. The purpose of this arrangement appears hereinafter.

The discharge ends of the chutes 119 are provided with complemental pivotally mounted jaws 138 and 139, the jaws being cross-sectionally arcuate and of axially tapering shape so that they provide contracted discharge mouths for the tubes. Being spring-pressed, as indicated at 140, to closed position, the jaws retain the pins in the tubes until the pins are withdrawn by the pull magnets incorporated in the pin seats 81 in the pin table. The withdrawing operation of the pins, however, effects spreading of the jaws and in this operation a circuit closing operation is effected by the pins, since the jaws 129 are provided each with a circuit closer 141 carried at the free extremity of a flexible spring 142 secured to the jaw on the interior. The circuit closers 141 bridge the contacts 143 carried by but insulated from the plates 144 mounted at the lower extremities of the tubes 119. The plates 144 are flexible but they hold the contacts 143 spaced from the jaws 139, except when the latter are spread in the pin discharging movement. At that time, the circuit closers 141 are brought into bridging relation with the contacts 143 to close the control circuit later described.

The conveyor belt, when the apparatus is in operation, is driven by a motor 143 operatively connected with the roll 106a by a worm and worm wheel connection indicated at 146. This motor is designed for continuous operation while the apparatus is in use and to this end is supplied direct from the line when the control switch 147 is closed.

The contacts 143 on the jaws of the pin chutes are all serially connected on the secondary of a transformer 148, so that the circuit of the latter will not be closed except with a full complement of pins in their respective chutes. Connected in series with the several circuit closers embodying the contacts 143 is an electromagnet 149 which functions to close a pair of single-pole switches 150 and 151, these switches being connected for synchronous movement. The main control switch 152 is of the single-throw double-pole form and the motor 45 is the universal form of motor but with differentially wound field coils 45a and 45b which are alternately active to drive the motor in alternatively opposite directions.

In the remote or pin receiving position of the table, it functions to shift the positions of the single-pole switches 153 and 154 to the opposite position from that which they normally occupy by reason of the action of the spring 155. The switches are connected for synchronous movement and when the spring 155 is active, the switch 153 is closed and the switch 154 is open. When the carriage reaches the remote position, however, it engages the lever 156, shifting the switch 153 to open position and the switch 154 to closed position.

A circuit closer in the form of an electromagnet 157 and an associated armature 158 controls the starting operation of the motor in shifting the table from its position in the alley to its pin receiving position.

In the operation of the invention, the following functions are carried out in the order recited below. The first operation is to close the switch 152 which places the motor in circuit provided the interposed circuit closers function. With the table in position in the alley and the pins mounted thereon, the segments 104 in each pin spot are bridged with the bridging ring 103 carried by the pin. The magnet 157 is thus placed in circuit and holds its armature 158 against the tension of the retracting spring, so that the armature is in open circuit position. For the sake of clarity, it is assumed that the current flow is uni-directional, although the apparatus is designed for use with alternating current. With the pins on the spots, current will flow from the main conductor 159, across one blade of the switch 152, over the conductor 160, conductor 161, the magnet 157 to one of the conductors 84, then across the bridging rings 103 of the pins to the opposite conductor 84, thence over the conductor 162, the conductor 163 back to the oposite side of the line 164. Since the pin table is in position the switches 95, 96 and 97 are in open position and no current can flow through them and the ball actuated circuit closer is in its retracted position where the leading arm 127 invades the ball return rack. As the pins are knocked down by the moving balls, the magnet 157 remains energized until the last pin is knocked from its spot, as all the circuit closers comprising the segments and the pin carried rings are in parallel. But the first ball is picked up by the conveyor and transferred to the ball return chute 120, shifting the ball actuated circuit closer one step as it passes down the return rack. This operation engages the contact 133 with the contact 134 but this latter contact is connected in on the armature 158 and if the magnet 157 is still energized, no current can flow. Assume, however, that a strike has been made. All of the pins will then have left their spots, so that they will perform no circuit closing function and the magnet 157 will be de-energized, permitting the armature 158 to perform its circuit closing function. Current will then flow over the conductor 160, the conductor 165, the conductor 166 to the circuit closer comprising the arms 127, thence across the engaged contacts 133 and 134, thence over the conductor 167 to the armature 158, thence over the conductor 168 to the switch 153, thence over the conductor 169, through the field winding 45a and serially connected armature and thence over the conductor 163 to the line. But energizing the motor, results in the transfer of the table to the remote end of its track. This, assuming that there has been a strike made on the first ball rolled. Normally one of the bridging arms 137 is positioned to bridge the contacts 135 and 134. If a strike is not made by the first ball, that will advance the ball actuated circuit closer to engage the contacts 133 and 134. The following ball will advance the circuit closer still another step when the contact 133 is brought into engagement with the contact 135. If the second ball has removed all the pins from the table, as when a spare is made, the magnet 157 will be deprived of current, the armature 158 will drop and the motor will be set in operation to shift the pin table, current flowing through the various circuits as above described, since, reaching the contact 133 it may pass from that to the contact 135, then across the bridge arm 137 to the contact 134 and thence over the conductor 167 as formerly. If a spare is not made, any pin remaining on its spot will close the circuit on the magnet 157, so that the armature 158 is retained in circuit opening position but the third ball will nevertheless effect operation of the table even though all of the pins may not have been knocked down by it. As the third ball is raised by the conveyor and transferred to the return rack, the ball actuated circuit closer is advanced another step, so that the contact 133 engages the contact 136. Current reaching the contact 133 may then pass to the contact 136, from which it will pass over the conductor 170 to the segment 171 (which is a part of a manual switch hereinafter described), thence over the conductor 171 to the conductor 168 and through the motor as before described. While the motor may not be set in operation because of a remaining pin retaining the armature 158 in circuit opening position, it will be set in operation by the third ball passing.

Any one of the conditions obtaining which will effect starting of the motor will result in the withdrawal of the pin table and the rocking of the table pressure feet 90 which by virtue of the operative connection between one of them and the switches 95, 96 and 97, will move them to closed position. During the time that the table is being moved, the pins are being transferred to the pin chutes 119, the retaining magnets 123 on the conveyor belt being energized from the conductor bars 125 which are connected one to each side of the line which is controlled by the switch 147. As the pins are elevated and dropped one each into its chute, they all move by gravity to the discharge ends of the chutes and seat in the jaws 138 and 139. They do not, however, close the circuit closers comprising the elements 141 and 143 and will not perform this function until they are withdrawn from the chutes. The movement of the table is, as before explained, preceded with the operation of the sweep but after the table begins to move, it is transferred to the remote end of its track, when it engages the lever 156 and operates the switches 154 and 153, shifting the latter to open position and the former to closed position. The switch 154 controls the circuit on the pawl magnet 132. This magnet being unenergized when the switch is in open position, the pawl is active to retain the ball actuated circuit closer in any of its several positions, in the third of which it is assumed to be under the conditions of this description. When the switch 154 is closed, current will flow from the line over the conductor 160 to the switch 97, thence over the conductor 172 to the primary of the transformer 148, thence over the conductor 173 to the opposite side of the line. The primary of the transformer 148 is thus energized but the circuit on the secondary is still open by reason of the open positions of the circuit closers comprising the members 141 and 143.

After the table leaves its position in the alley where circuit closing operation is imparted to the switches 95, 96 and 97, the pin spot magnets become energized, for their circuit is controlled by the switch 96, current flowing from one side of the line controlled by the switch 147 over the conductor 174, to one of the conductors 85, thence over the collector roller bearing on that conductor through the several pin spot magnets to the other collector roller, thence to the other conductor 85, thence over the conductor 175, across the switch 96, over the conductor 176 to the opposite side of the line. Thus as soon as the pin table is withdrawn from position in the alley, the pin spots become energized and when the pin table reaches its remote position in the track, the energized pin spots being presented to the pins in the pin chutes, the latter are withdrawn from the pin chutes into engagement with the pin spots and in this operation all of the circuit closers comprising the contact members 141 and 143 are moved into circuit closing position. If a pin be missing, the contacts associated with that pin chute will not be brought into circuit closing position, so that the apparatus cannot operate to effect return of the motor until the missing pin is deposited in its chute, for all of the circuit closers 141—143 are in series. If the full complement of pins has been deposited in the chutes, when they are withdrawn by the pull of the magnets in the pin spots of the table, the circuit closers 141—143 are closed, thus closing the circuit on the secondary of the transformer 148, current flowing from one terminal of the secondary over the conductor 177, through the several circuit closers 141—143, over the conductor 178, through the magnet 149 and back to the secondary of the transformer. But when the magnet 149 is energized, the switches 150 and 151 are moved into circuit closing position against the pull of the spring which normally holds them in open position. When the switch 151 is moved to closed position, current will flow from one side of the line to the switch 151, over the conductor 179 to the switch 95, thence over the conductor 180 to the motor 45, passing this time through the field coil 45b, so that a reverse direction than formerly is imparted to the motor. The table will thus be started back toward the alley by the reverse movement of the motor and the pins having been deposited on the pin spots will be retained thereon by the pin spot magnets whose circuit is controlled by the switch 96. But the withdrawal of the pins from the chute will permit the return of the circuit closers 141—143 to open position but the magnet 149 will be unaffected by this, since the closing of the switch 150 throws the magnet directly across the secondary of the transformer 148 and it will thus function to retain the switch in closed position, as well as the switch 151, until the circuit on the primary is opened, as it will be when the table is returned to its position in the alley.

When the table leaves its pin receiving position, the switches 153 and 154 are actuated by the spring 155, the former being shifted to closed position and the latter to open position. But when this condition obtains, the magnet 157 will be energized and the armature 158 will be raised to open position, because the presence of a pin on a pin spot of the table results in closing the circuit on the magnet 157. Thus the closing of the switch 153 in the return movement of the table does not result in energizing the field coil 45a, since its circuit is open at the armature 158.

When the table reaches its normal position in the alley, the pressure feet are elevated and the switches 95, 96 and 97 are shifted to open position and since the switch 97 controls the circuit on the primary of the transformer 148, that will be deprived of current, as will also the secondary. The magnet 149 will thus be de-energized and the spring will be effective to shift the switch 150 and the switch 151 to open position. Since the circuit on the field coil 45b is controlled by the switch 95, the opening of the latter with the return of the table to normal position will stop the operation of the motor. The opening of the switch 151 will prevent energization of the field coil 45b when the switch 95 is closed in starting the table towards its pin receiving position. This switch 151, having been first opened, is not closed except by the transfer of the pins to the table in the pin receiving position of the latter.

A manual switch is provided in the form of a lever 181 to be moved into engagement with the segment 170. The lever is retracted to open position by means of a spring 182 and it is operatively connected with a dashpot 183, the dashpot being of the character which will permit the quick movement of the lever into segment engaging position but will retard its movement to open position under the action of the spring 182. This manual switch is designed for operation at the runway end of the alley, should one or more pins be knocked down by a stray pin from another alley, where there would be no balls in the particular alley to set the apparatus in operation. The shifting of the lever 180 into engagement with the segemnt 170 bridges the conductors 165 and 171, so that current can flow from one side of the line over the conductor 160, conductor 165, across the manual switch to the conductor 171, thence over the conductor 168, switch 153 and conductor 169 to the field coil 45a of the motor, starting the motor to effect transfer of the table to the pin receiving position. The dashpot 183 will maintain the lever in contact with the segment long enough to effect the movement of the table to the pin receiving end of the track where the pick-up transfers the pins to the table and the return of the table to the alley will be effected in the manner before described.

The invention having been described, what is claimed as new and useful is:

1. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a pin conveyor, pin chutes having their discharge ends disposed directly above the table in the remote position of the latter, the conveyor traversing the pit, and means for receiving pins from the conveyor and directing them into the intake ends of the chutes.

2. In combination with a bowling alley, an automatic pin receiving mechanism comprising a table positioned in the alley in front of a pin receiving pit with which the alley is provided, the table being movable from its position in the alley to a point remote therefrom, transfer means for so moving the table, a pin conveyor, pin chutes having their discharge ends disposed directly above the table in the remote position of the latter, the conveyor traversing the pit to pick up pins deposited in the latter, means for receiving the pins from the conveyor and directing them into the intake ends of the chutes, and pin controlled means for automatically setting the table transfer means into operation.

3. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a pin conveyor traversing the pit to pick up pins deposited in the latter, pin chutes having their discharge ends disposed directly above the table in the remote position of the latter, and means for receiving pins from the conveyor and directing them one into the intake end of each of the chutes.

4. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a pin conveyor traversing the pit to pick up pins deposited in the latter, pin chutes having their discharge ends disposed directly above the table in the remote position of the latter, means for receiving pins from the conveyor and directing them one into the intake end of each of the chutes, table-carried pin-controlled means for effecting operation of the transfer means to carry the table from the alley to its remote point, and chute-carried pin-controlled means to effect operation of the transfer means to return the table to its position in the latter.

5. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a pin conveyor traversing the pit to pick up pins deposited therein, automatic means to effect operation of the transfer means, and means for taking pins from the conveyor and depositing them on the table in the remote position of the latter.

6. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a pin conveyor traversing the pit to pick up pins deposited therein, automatic means to effect operation of the transfer means, a sweep for removing pins from the alley and the table into the pin receiving pit, said means being actuated by the table transfer means in advance of the table being shifted from its position in the alley, and means for taking pins from the conveyor and returning them to the table in the remote position of the latter.

7. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a conveyor traversing the pit and provided both with ball and pin seats to remove pins and balls from the pit, a ball chute for receiving balls from the conveyor and returning them to the runway end of the alley, pin chutes having their discharge ends disposed directly above the table in the remote position of the same, and means for receiving pins from the conveyor and directing them one into the intake end of each of the chutes.

8. In combination with a bowling alley, an automatic pin resetting mechanism comprising a table positioned in the alley in front of the pin receiving pit with which the alley is provided, the table being movable from its position in the alley to a point remote therefrom, transfer means for so moving the table, a conveyor traversing the pit and having pin and ball seats to pick pins and balls from the pit, means for taking pins from the conveyor and returning them to the table in the remote position of the latter, means for taking balls from the conveyor and returning them to the runway end of the alley, and ball actuated means for controlling the operation of the table transfer means.

9. In combination with a bowling alley, an automatic pin resetting mechanism comprising a table positioned in the alley in front of the pin receiving pit with which the alley is provided, the table being removable from its position in the alley to a point remote therefrom, transfer means for so moving the table, a conveyor traversing the pit and having pin and ball seats to pick pins and balls from the pit, means for taking pins from the conveyor and returning them to the table in the remote position of the latter, means for taking balls from the conveyor and returning them to the runway end of the alley, and co-ordinated pin-controlled table-carried means controlling the operation of the table transfer means.

10. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a sweep to move balls and pins dropping in the alley into the pit and operatively connected with the transfer means to be actuated by the same in advance of movement of the table, a conveyor traversing the pit to pick up pins and balls therefrom, means for taking pins from the conveyor and returning them to the table in the remote position of the latter, and means for taking balls from the conveyor and returning them to the runway end of the alley.

11. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a conveyor traversing the pit to pick up pins deposited therein, a rack for receiving pins from the conveyor, and chutes having their discharge ends adjacent the table in the remote position of the latter and their intake ends adjacent said rack, the rack having means to automatically transfer the pins to the chutes on the reception of the full complement of pins.

12. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a conveyor traversing the pit to pick up pins deposited therein, a rack for receiving pins from the conveyor and chutes having their discharge ends adjacent the table in the remote position of the latter and their intake ends adjacent said rack, the rack having means to automatically transfer the pins to the chutes on the reception of the full complement of pins, the rack comprising complemental rack frames yieldingly impelled to position in a common plane to jointly embrace the necks of pins, and a latch member retaining said frames in such position and disposed to be moved out of latching position by the pin first received in the rack after the full complement are received.

13. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, the conveyor traversing the pit to pick up pins therefrom, means for taking pins from the conveyor and returning them to the table in the remote position of the latter, and automatic means retaining the pins in upright position on the table after reception thereon from the last said means, the pin retaining means being rendered inert when the table is in its position in the alley.

14. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a conveyor traversing the pit to pick up pins and balls therefrom, means for taking pins from the conveyor and returning them to the table in the remote position of the latter, means for taking balls from the conveyor and returning them to the runway end of the alley, and a ball-actuated step-by-step member for controlling the operation of the table transfer means to determine which particular ball shall effect operation of the latter.

15. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a conveyor traversing the pit to pick up pins and balls therefrom, means for taking pins from the conveyor and returning them to the table in the remote position of the latter, means for taking balls from the conveyor and returning them to the runway end of the alley, and a ball-actuated step-by-step member for controlling the operation of the table transfer means to determine which particular ball shall effect operation of the latter, the table transfer means comprising a motor and the step-by-step member comprising a switch controlling the motor and having means for varying the position of its live contact points.

16. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a conveyor traversing the pit to pick up pins therefrom, the conveyor having pin seats, a member for receiving pins from the pin seats, means for energizing the pin seats in their path of travel from the pit to said member to maintain the pit substantially vertical on the conveyor, and means for receiving pins from said member and transferring them to the table in the remote position of the latter.

17. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a conveyor traversing the pit to pick up pins therefrom, the conveyor having pin seats, a member for receiving pins from the pin seats, means for energizing the pin seats in their path of travel from the pit to said member to maintain the pit substantially vertical on the conveyor, and means for receiving pins from said member and transferring them to the table in the remote position of the latter, the table having pin spots energized to maintain the pin upright except when the table is in its position in the alley.

18. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a sweep for brushing pins and balls from the alley into the pit, said sweep being operatively connected with the transfer means to be actuated by the latter in advance of any movement of the table, a conveyor traversing the pit and having pin and ball seats thereon to pick up pins and balls from the pit, means for receiving the balls from the conveyor and transferring them to the runway end of the alley, a rack for receiving pins from the pin seats, and chutes having their intake ends disposed adjacent said rack and their discharge ends adajcent said table in the remote position of the latter, the rack having means for automatically discharging the pins into the chutes only upon receiving a full complement of pins.

19. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a sweep for brushing pins and balls from the alley into the pit, said sweep being operatively connected with the transfer means to be actuated by the latter in advance of any movement of the table, a conveyor traversing the pit and having pin and ball seats thereon to pick up pins and balls from the pit, means for receiving the balls from the conveyor and transferring them to the runway end of the alley, a rack for receiving pins from the pin seats, chutes having their intake ends disposed adjacent said rack and their discharge ends adjacent said table in the remote position of the latter, the rack having means for automatically discharging the pins into the chutes only upon receiving a full complement of pins, and table-carried pin-controlled means governing the operation of the table transfer means to effect movement of the table from its position in the alley to its remote point.

20. In combination with a bowling alley, an automatic pin resetting mechanism comprising a table positioned in the alley in front of a pin receiving pit with which the alley is provided, the table being movable from its position in the alley to a point remote therefrom, transfer means for so moving the table, a sweep for brushing pins and balls from the alley into the pit, said sweep being operatively connected with the transfer means to be actuated by the latter in advance of any movement of the table, a conveyor traversing the pit and having pin and ball seats thereon to pick up pins and balls from the pit, means for receiving the balls from the conveyor and transferring them to the runway end of the alley, a rack for receiving pins from the pin seats, chutes having their intake ends disposed adjacent said rack and their discharge ends adjacent said table in the remote position of the latter, the rack having means for automatically discharging the pins into the chutes only upon receiving a full complement of pins, table-carrier pin-controlled means governing the operation of the table transfer means to effect movement of the table from its position in the alley to its remote point, and chute-carried pin-controlled means governing the operation of the table transfer means to effect operation of the same to return the table to its position in the alley.

MICHAEL THOMAS.